US005965244A

United States Patent [19]

Tang et al.

[11] Patent Number: 5,965,244

[45] Date of Patent: Oct. 12, 1999

[54] PRINTING MEDIUM COMPRISED OF POROUS MEDIUM

[75] Inventors: YuYing Tang, Hadley; Alan Richard Taylor, Springfield; Gary C. Grinnell, Northampton; Richard S. Himmelwright, Wilbraham, all of Mass.

[73] Assignee: Rexam Graphics Inc., So. Hadley, Mass.

[21] Appl. No.: 08/957,768

[22] Filed: Oct. 24, 1997

[51] Int. Cl.[6] ................................ B32B 3/00; B41M 5/00

[52] U.S. Cl. ....................... 428/195; 428/212; 428/304.4; 428/323; 428/328; 428/331; 347/105

[58] Field of Search .................................... 428/195, 207, 428/212, 304.4, 323, 328, 331; 347/105

[56] References Cited

U.S. PATENT DOCUMENTS

| | | | |
|---|---|---|---|
| 5,264,275 | 11/1993 | Misuda et al. | 428/304.4 |
| 5,275,867 | 1/1994 | Misuda et al. | 428/195 |
| 5,463,178 | 10/1995 | Suzuki et al. | 428/216 |
| 5,856,001 | 1/1999 | Okumura et al. | 428/331 |

*Primary Examiner*—Elizabeth Evans

*Attorney, Agent, or Firm*—Burns, Doane, Swecker & Mathis, L.L.P.

[57] ABSTRACT

Provided is a printing medium particularly useful for inkjet printing. The printing medium is comprised of a substrate and a coating layer. The coating layer comprises porous particles, a resin binder and colloidal particles, with the colloidal particle being of a size that is greater than the size of the pores of the porous particles, but smaller than the interstitial pores created by the porous particles. The printing medium allows one to realize high optical density and high image resolution, while also offering good mechanical properties, fast drying, good waterfastness and consistent performance in different environments.

26 Claims, 1 Drawing Sheet

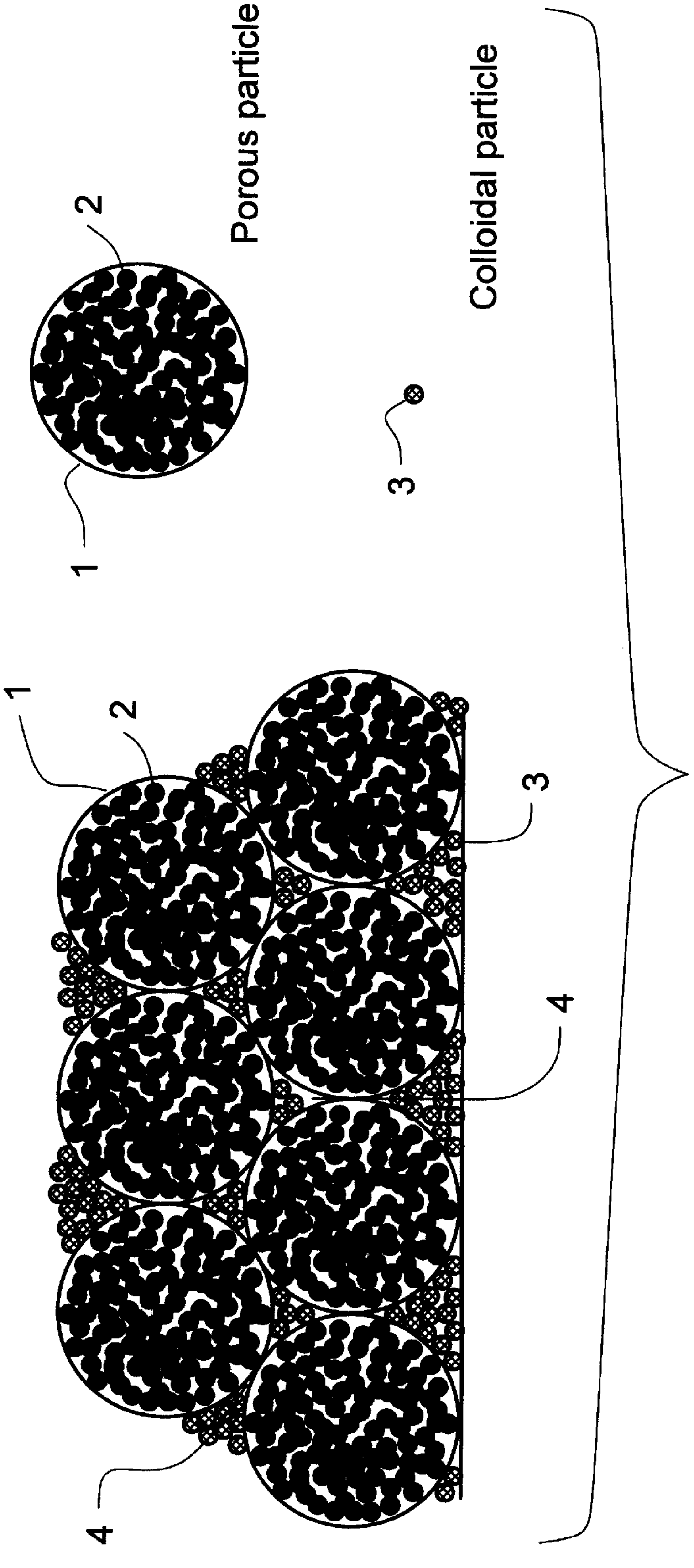
FIGURE

PRINTING MEDIUM COMPRISED OF POROUS MEDIUM

BACKGROUND OF THE INVENTION

Field of the Invention

The present invention relates to a recording medium useful in color printing, particularly for ink jet printing. More specifically, the present invention relates to a recording medium for ink jet printing comprised of a porous coating on a substrate. The present invention also relates to a method of printing using the medium of the present invention.

Ink jet printing is a printing technology in which color dots are formed on a substrate from ink droplets ejected from nozzles in a print head. The inks are generally composed of water, a water-soluble dye or a pigmented dye, one or more water-miscible cosolvents, and one or more surfactants. The substrate (ink jet medium) can be plain paper, coated paper, plastic film, cloth, and any other media which can absorb ink and form a good image. In order to form a high resolution image, the substrate is usually coated with a specially formulated ink jet coating. These coatings can be divided into two major categories, fully dense coatings and porous coatings.

The fully dense coatings are mainly comprised of film-forming polymers, with at least one of the polymers being hydrophilic. This hydrophilic polymer is either water soluble or water swellable. Sometimes a small amount of pigment is incorporated into these coatings, but the amount of pigment is usually far below the critical pigment volume concentration. This type of coating gives a glossy surface and is usually transparent. The fully dense coatings absorb ink and form an image through rapid swelling of the coating itself. The major disadvantages of this type of coating include the long ink dry time, low water resistivity of both the coating and the printed image, sensitivity of the image quality to the environment, and the difficulty in achieving a "universal" medium which would perform on all printers.

A polymeric coating is generally saturated with ink immediately after printing. This ink plasticizes the polymer coating and lowers the glass transition temperature of the coating. The coatings are tacky for a certain amount of time, usually from 30 seconds to 10 minutes, until enough solvent is evaporated from the coating to bring the glass transition temperature of the coating to near or above room temperature. During the time period, the image would smear if touched and it would block to another sheet of paper or film.

A polymeric coating needs to absorb a high amount of water rapidly to obtain a high quality image without bleeding and coalescence. On the other hand, it needs to be waterfast to provide durability. These two requirements frequently conflict with each other. It is very difficult to achieve good waterfastness and high water absorbency at the same time. The coating also needs to anchor the dye molecules in order to achieve image waterfastness. The dye molecules are water-soluble or at least water-dispersible in an aqueous ink and these same molecules need to be completely insolubilized once they are deposited and diffused into the coating. A complete insolubilization of the dye is difficult to achieve.

The polymeric ink jet coating always contains moisture and the amount of moisture depends on the environment. The imaging characteristics and ink dry time is, therefore, a function of temperature and humidity. For example, under cold and dry conditions, the equilibrium moisture in the coating is low, the free volume is also low. The initial diffusion coefficient of ink in the coating is lower than in the same media exposed to a hot and humid atmosphere. Color bleeding and coalescence can occur. In a hot and humid environment, the equilibrium moisture in the coating is high. The free volume of the coating is higher than in dry and cold conditions. Dye molecules in the ink can easily diffuse into the coating. However, the image is likely to be tacky for a long time after printing and blocking resistance of the image is expected to be low. Different environments also affect the dimensional stability of the coating due to the moisture change in the polymer. An anticurl coating is generally needed in order to balance out the dimensional change of the coating with the atmosphere. This anticurl layer adds cost to the production process.

The coating composition needs to be carefully tailored to ensure compatibility between the coating and the dye, the cosolvents in the ink, and the surfactants in the ink. For fully dense polymeric coatings, it is nearly impossible to design a "universal" ink jet medium which performs well on all or most of the commercial ink jet printers.

The second type of coating for ink jet applications is a porous coating. This type of coating is usually composed of inorganic or organic particles bonded together by a binder. The amount of pigment particles in this type of coating is often far above the critical pigment volume concentration, which results in high porosity in the coating. During the ink jet printing process, ink droplets are rapidly absorbed into the coating through capillary action and the image is dry-to-touch right after it comes out of the printer. Therefore, porous coatings allow a fast "drying" of the ink and produces a smear-resistant image. The dye molecules adsorb on the surface of the particles and form an image. High water resistance of both the coating and the image can be achieved with the porous coating. The performance of the porous ink jet coating is less sensitive to the compositions of the ink. Therefore, a universal medium which performs well on all printers can be designed. The performance of a porous coating is also much less sensitive to the temperature and humidity of the environment, so consistent imaging characteristics and dry time can be expected. The disadvantages of this type of coating, however, is the difficulty in achieving high gloss due to the high porosity in the coating.

The pigments used in ink jet coatings are usually clay (U.S. Pat. No. 4,732,786), calcium carbonate (U.S. Pat. No. 4,474,847), magnesium carbonate (U.S. Pat. Nos. 5,338,597, 5,227,962, 5,246,774), silica (UK Patent Nos. GB2129333, 2166063), surface modified silica (U.S. Pat. No. 5,372,884), zeolite, and alumina (U.S. Pat. No. 5,182,175). A combination of two or more of the above mentioned pigments can also be used. Most of these porous coatings are opaque. Therefore, dye molecules should be kept on the top surface layer in order to achieve high optical density. Pigments with high surface area are desirable, in order to keep the dye molecules on the surface layer.

Silica pigments are especially preferred in ink jet applications due to the availability of a variety of silica gels and precipitated silica with high surface area and high internal pore volume. U.S. Pat. No. 4,780,356 describes a coating composed of porous silica bonded by a water-soluble binder such as polyvinyl alcohol. The particles have a pore volume of 0.05–3.00 cc/g, a particle size of 0.1 to 5 μm, and a pore size of 1 to 500 nm. U.S. Pat. No. 5,352,503 describes a coating based on silica gel with polyvinyl alcohol as the binder, polyethylene glycol as a curl-reducing agent, and a polyquaternary amine as a dye mordant.

The porous coatings composed of porous particles such as silica or zeolite possess fast drying characteristics. However, high resolution image and strong mechanical strength are difficult to obtain. The internal pores are between 1 and 50 nm for silica gel, and between 1 and 500 nm for precipitated silica. The interstitial pore size between particles is 0.4 to 3 μm for 2 to 15 μm particles. The nonuniform pore size distribution is a problem in that it results in differential capillary pressures within the coating, causing ink to migrate from large pores to small pores. This ink migration causes nonuniform color density, which lowers the sharpness of color tone.

The binders for these coatings are usually hydrophilic binders such as polyvinyl alcohol. The waterfastness of the coating is a function of the pigment to binder ratio. If the amount of binder is low enough so that all the polymer binder is adsorbed on the particle surface, good waterfastness can be achieved. However, the coating would have very little flexibility. This type of coating can be used with a plain paper substrate, where a thinner coating layer is required since the base paper can absorb some of the ink vehicle. In the case of impermeable substrates such as polyester and polyvinyl chloride, or low permeability substrates such as highly sized glossy paper, a thick coating (10–80 μm) is required to accommodate all the ink since the coating is the sole ink absorbent. This type of coating is not suitable due to its brittleness.

When the pigment to binder ratio decreases, the toughness of the coating increases and the porosity of the coating decreases. After the particle surface is fully covered with adsorbed binder, any additional binder occupies the interstitial space. The binders adsorbed on the particle surface has limited configuration and mobility, and it is water insoluble. The other part of the binder is free polymer and it dissolves in water. As the amount of free polymer increases, the coating loses its waterfastness. The ink jet medium described in U.S. Pat. No. 5,352,503 falls into this category.

U.S. Pat. Nos. 4,879,155, 5,104,730, 5,264,275, 5,275,867 (Asahi) disclose a type of porous coating which is composed of colloidal boehmite particles bonded together by a water-soluble binder such as polyvinyl alcohol. The pore size in these coatings are controlled, so that the radius of the majority of pores lies between 1 and 10 nm. Unlike the porous coating described above, these porous coatings are transparent due to the small particle size and pore size. High optical density can be achieved whether the dye molecules are kept on the surface layer or not. Good waterfastness of both the coating layer and the printed image are achieved in this type of coating, because the polymer binder in the coating and the anionic dye in the inks are adsorbed on the surface of boehmite particles.

A porous coating composed of uniform colloidal particles can provide uniform pore size distribution, which results in high image resolution. The disadvantage of this type of coating is the low mechanical strength of the coating. The porosity only comes from interstitial pores (which are pores created by the particles themselves), i.e., the spaces between the particles, since the colloidal particles themselves are fully dense. As a result, the porosity of this type coating is usually lower than the coating composed of porous particles, which means an even thicker coating is needed to accommodate all the inks. The thicker the coating, the more difficult to overcome the brittleness of this type of coating. It is anticipated that the mechanical properties of this type of medium face severe challenges with the emergence of high ink flux and high resolution printers.

It is therefore an objective of the present invention to provide an ink jet medium which possesses high optical density and high image resolution.

It is another objective of the present invention to provide an ink jet medium which also possesses good mechanical properties, fast drying and good water fastness.

Yet another objective of the present invention is to provide an ink jet medium which provides consistent performance at different environments, as well as high optical density, high image resolution, good water fastness, fast drying and good mechanical properties.

Still another object of the present invention is to provide such an ink jet medium which is universal in that it will perform well with all printers.

These and other objects of the present invention will become apparent to the skilled artisan upon a review of the following specification. The FIGURE of the Drawing, and the claims appended hereto.

SUMMARY OF THE INVENTION

In accordance with the foregoing objectives, the present invention provides a printing medium particularly useful in ink jet recording. The printing medium is comprised of a substrate and a coating layer. The coating layer comprises porous particles, a resin binder and colloidal particles, with the colloidal particle being of a size that is greater than the size of the pores of the porous particles, but smaller than the interstitial pores created by the porous particles.

In a preferred embodiment, the colloidal particles of the printing medium coating layer fill the interstitial pores created by the porous particle and create micropores between the colloidal particles which approximate the size of the internal pores of the porous particles. In such an instance, a truly uniform surface and coating layer is created. It is also preferred the size of the colloidal particles is from about 1 to 6 times the internal pore size of the porous particles.

The printing medium of the present invention is particularly useful for ink jet printing and permits one to realize high optical density and high image resolution in the printing, while offering good mechanical properties, fast drying, good water fastness and consistent performance in different environments. Moreover, the printing medium of the present invention is also essentially a universal medium which will perform well with all conventional printers.

In another embodiment, the present invention provides a process for generating images in an ink jet printing apparatus. The process comprises incorporating the printing medium of the present invention into an ink jet printing apparatus and forming an image on the printing medium by causing ink to be expelled onto the coated surface. High optical density and high image resolution is exhibited by the printed matter, as well as fast drying.

BRIEF DESCRIPTION OF THE DRAWING

The FIGURE of the Drawing illustrates conceptually the coating layer of the present invention, comprising porous particles and colloidal particles. The actual particles may or may not be as spherical as depicted in the FIGURE of the Drawing.

DETAILED DESCRIPTION OF THE PREFERRED EMBODIMENTS

The concept of the present invention is illustrated in the FIGURE of the Drawing, where 1 represents porous particles and 3 represents interstitial or colloidal particles. The size of the colloidal particles 3 is greater than the size of the pores 2 of the porous particles, but smaller than the interstitial pores 4 created by the process particles. In the printing medium of the present invention, the colloidal particles fill the interstitial pores 4 created by the porous particle 1 and create micropores 5 between the colloidal particles which approximate the size of the internal pores of the process particle.

Generally, it is preferred that the size of the colloidal particles 3 is from about 1 to 6 times the internal pore size 2 of the process particles 1, more preferably from 2 to 5 times, and most preferably about 3 times the size of the internal pores. The size of the porous particles 1 generally ranges from 1 to 16 microns, with a size in the range of from about 2.5 microns being most preferred. The size of the pores 2 in the porous particles can range from 1 to 500 nanometers, more preferably from 1 to 35 nanometers, and most preferably from 5 to 15 nanometers in size. The colloidal particles 3 are therefore preferably of a size ranging from 5 to 700 nanometers, more preferably from 5 to 100 nanometers, and most preferably from 10 to 70 nanometers.

The porous particles 1 can be any known process particle. Silica and alumina particles are preferred as they are easily obtainable and they work well. Aluminum silicates and calcium silicates are examples of other particles that can work well. The colloidal particles are preferably of a composition that matches the chemistry of the porous particle. For example, if the porous particle is a silica, the colloidal particle is preferably a silica. If the porous particle is an aluminum oxide or aluminum hydroxide, the colloidal particle is preferably an alumina or boehmite hydroxide particle. If the porous particle is a calcium silicate particle, the colloidal particle is preferably silica.

Best imaging properties can be achieved if: a) the porous particles and interstitial particles have the same or similar surface chemistry and, b). the interstitial pore size ($d_{pore}^{B}$) matches the internal pore size of the porous particle. The second requirement can be satisfied if: a) the internal pore size of the porous particle ($d_A^{pore}$) and the particle size of the colloidal interstitial particle ($d_B$) satisfy the following equation:

$$\frac{d_B}{d_A^{pore}} = 3.3x \ (x = 0.1\text{–}10)$$

and, b) the weight ratio of the interstitial particles ($W_B$) to the porous particles ($W_A$) is:

$$0.1y \le \frac{W_B}{W_A} \le 10y, \text{ and } y = \frac{\rho_B(1 + \rho_A v_A^{pore})}{3.4\rho_A},$$

wherein $\rho_A$ and $\rho_B$ are densities of the porous and interstitial particles, respectively, and $v_A^{pore}$ is the internal pore volume of the process particles (cc/g).

In using the printing medium of the present invention in ink jet printing, an image is formed on the printing medium by causing ink to be expelled onto the coated surface. When the ink droplets hit the medium during printing, they are immediately wicked into the pores through capillary action. The magnitude of this capillary pressure is $$P_c = 2\gamma\left(\frac{\cos\theta}{R}\right) \quad (1)$$

where $\gamma$ is the surface tension of the ink, R is the radius of the pores, and $\theta$ is the contact angle between the ink and the particle surface. The contact angle is determined by the surface tension of the ink ($\gamma_{LV}$), the surface tension of the particles ($\gamma_{SV}$) and the particle-liquid interfacial energy ($\gamma_{SL}$) according the following equation:

$$\cos\theta = \frac{\gamma_{SV} - \gamma_{SL}}{\gamma_{LV}} \quad (2)$$

It is clear from equations 1 and 2 that a uniform capillary pressure in the coating can only be achieved when the contact angle and the pore size are uniform across the coating. This can be easily achieved by constructing a coating from uniform size colloidal particles, such as those mentioned in U.S. Pat. Nos. 4,879,155, 5,104,730, 5,264,278, 5,275,867 (Asahi). Unfortunately, it is difficult to achieve high porosity and maintain high mechanical strength in such a coating since the porosity comes only from interstitial pores.

In the medium of the present invention, porous macroparticles are mixed with fully dense fine particles. The porous particles provide high mechanical strength and high porosity to the coating. The fine particles have two functions: first, they act as co-binder to the porous particles and increase the strength of the coating; second, they fill interstitial pores and converts the interstitial macropores into many micropores or mesopores which have the same pore size as the internal pores of the porous particle. In the following discussion, silica is used as an example to illustrate the present invention, but it should be understood that the same principle can be applied to many other systems.

The packing density of spherical porous particles can be estimated by the following equations:

$$\phi_{ij} = 0.639 + [\phi^{max}(d_i/d_j) - 0.639]/0.265 \ (\text{if } d_i/d_j \ge 1, \ i \ge j) \quad (3)$$

$$\phi_{ji} = 0.639 + [\phi^{max}(d_i/d_j) - 0.639]/0.735 \quad (4)$$

$$\phi_i = \sum_{j=i}^{m} \phi_{ij} V_j \qquad \left(\sum_{j=i}^{n} V_j = 1\right) \quad (5)$$

$$\phi = \min(\phi_i) \quad (6)$$

where: $\phi_{ij}$ is binary packing coefficients of the packing for the size range i and size range j components, $d_i$, $d_j$, are diameters of particles in size range i and j components, $V_j$ is the volume fraction of size range j, $\phi^{max}$ ($d_i/d_j$) is the maximum packing factor, for spheres of diameter $d_i/d_j$ and $\phi$ is the random densest packing factor of the mixture.

The packing density of the porous particles is a function of particle size distribution and particle shape. The broader the particle size distribution, the higher the particle packing density. For example, the random close packing density of the monodisperse spheres is 0.639, while the random close packing density for a binary mixture of spheres at a mixing ratio of 1:1 and the diameter ratio of 1:10 is 0.833. See, for example, D. I. Lee, "Packing of Spheres and its Effect on the Viscosity of Suspensions," *Journal of Paint Technology*, Vol. 42, No. 550 (1970). The particle packing density is lowered by the adsorption of other molecules on the surface particles, such as the adsorption of polymer molecules. In our calculations, 0.64 is used as the random close packing density of porous silica particles.

The interstitial pore volume before adding the fine particles is:

$$V = \frac{1-\phi}{\phi} V_A = \frac{1-\phi}{\phi}\left(\frac{W_A}{\rho_A} + v_A^{pore} W_A\right) \quad (7)$$

where $V_A$ and $W_A$ are the volume and weight of the porous particles and $v_A^{pore}$ is the internal pore volume of the particles (cc/g). When the interstitial pores are completely filled by colloidal particles, $$V = \frac{V_B}{\phi_B} = \frac{W_B}{\phi_B \rho_B}$$

$\phi_B$ is the random close packing density of colloidal silica. Assuming the coordination number of colloidal silica is 6[1], $\phi_B$=0.52. Combining the above equations, we have:

$$\frac{W_B}{W_A} = 0.3(1 + 2.2 v_A^{pore}) \quad (8)$$

If the porous particles and colloidal interstitial particles are two different types of material, the weight ratio of the interstitial particles and the porous particles can be expressed by the following equation $$\frac{W_B}{W_A} = \frac{\rho_B(1 + \rho_A v_A^{pore})}{3.6 \rho_A} \quad (9)$$

Equation 9 is derived by assuming the random close packing density of the porous particles ($\phi$) is 0.64 and the random close packing density of the interstitial particles ($\phi_B$) is 0.50.

If the interstitial particles are uniform spherical particles, as in the case of colloidal silica, the ratio of the particle diameter and the diameter of the pores formed by random close packing of these particles can be estimated as $d_B=5d_{pore}^B$, where $d_B$ and $d_{pore}^B$ are diameter of the particles and the interstitial pore size. In a colloidal silica system, close packing is not achieved. Testing of colloidal silica particles indicates that the particle size and the pore size approximate the following equation:

$$d_B=3.3d_{pore}^B.$$

Therefore, the size of interstitial particles should be ideally chosen to be approximately 3.3 times of the internal pore size of the porous particles in order to achieve a uniform pore size distribution across the coating.

A small amount of organic binder is needed to provide flexibility to this system. This binder can be a water-soluble polymer or polymer latex. Examples of these polymers are polyvinyl alcohol, anionically or cationically modified polyvinyl alcohol, starch and modified starch, polyvinyl pyrrolidone, hydroxyethyl cellulose, carboxymethyl cellulose, casein, gelatin, polyethylene imine, polyethylene oxide, polyethylene glycol; SBR latex, NBR latex, polyacrylate emulsion, polyvinyl acetate latex, and polyurethane dispersion. The amount of binder used should be 5 to 80 volume percentage based on the volume of the particles.

In the case where both the porous particles and colloidal particles have anionic surface, such as in a porous silica plus a colloidal silica system, a cationic polymer is incorporated into the system to anchor the acidic dye molecules. Polyquaternary amine, polyethylene imine, copolymer of vinyl pyrrolidone and dimethylaminoethyl methacrylate, copolymer of vinyl pyrrolidone and methylvinylimidazole chloride, and aluminum polymeric complex are a few examples of the dye mordant can be employed. The cationic polymer is not necessary when the media is used in combination with a waterfast pigmented ink, e.g., as described in U.S. Pat. No. 5,503,664 (Epson pigmented ink).

Even though many organic binders can be used to provide toughness to the coating. Care should be taken to avoid polymers whose radius of gyration in water is smaller than half of the internal pore size of the porous particles. Otherwise, some of the binder can penetrate into the pores and reduce the porosity of the coating.

The substrate for this coating can be plastic film such as polyester films, and polyvinyl chloride films, canvas, cloth, plain paper, coated paper or any suitable substrate of suitable strength and appearance characteristics. The coating thickness ranges from 5 $\mu$m to 100 $\mu$m, depending on the drop size and resolution of the printers. For each printer and resolution combination, there is a critical thickness of the coating below which ink coalescence occurs. The coating thickness should be 1–5 $\mu$m above the critical thickness in order to achieve high resolution image and fast drying properties.

The printing medium of the present invention can be used for any printing activity. However, the medium is of particular use for inkjet printing. The printing medium permits one to realize high optical density and high image resolution in the printing, while also offering good mechanical properties, fast drying, good waterfastness and consistent performance at different environments. Moreover, the printing medium of the present invention is also essentially a universal medium which will perform well with all conventional inkjet printers.

The present invention also relates to the process for generating images in an inkjet printing apparatus. The process comprises incorporating the printing medium of the present invention into an inkjet printing apparatus. As mentioned earlier, the printing medium of the present invention is essentially universal and can be used with almost any known inkjet printing apparatus. In the process, an image is then formed on the printing medium by the inkjet printing apparatus by causing ink to be expelled onto the coated surface. The resulting image exhibits high optical density and high image resolution, and quickly dries.

This invention is further illustrated by the following examples. In these examples, color blocks of cyan, magenta, yellow, black, blue, green, and red were printed using the printers described below. Images on all the described examples dried instantaneously. The optical density (OD) of these blocks were measured with a X-Rite 938 and the color gamut is calculated. These blocks were then immersed in water for ten minutes and rinsed. After air dried for half an hour, the optical density was again measured and the color gamut was calculated. The wet rub resistance of the samples was tested by immersing the color blocks in water for 10 minutes, then pad dry the image, and rub the image with a paper towel. The wet rub resistance of the image was visually inspected and rated in a scale of 0 to 5. Scale 5 means no damage occurred to either the image or the coating after a wet-dry rub. Scale 0 means the image is completely ruined.

The adhesion test was conducted by placing a two-inch long piece of 3M#810 scotch tape to a secondary color blocks (usually green); rub the tape thoroughly with thumb to insure uniform adhesion and to eliminate trapped air; then removing the tape with a stead rapid pull. The adhesive/cohesive strength of the image and coating is rated in a scale of 0 to 5, according to the percentage of image transferred to the tape. Scale 5 indicates no coating or image is transferred to the tape, while scale 0 indicates 100% transfer of the image to the adhesive tape.

EXAMPLE 1 a) 20 g silica gel (IJ35 from Crosfield: pore volume: 63 vol % or 1.14 cc/g, pore diameter: 6.7 nm, surface area: 670 $m^2$/g, particle size: 4.5 μm)
b) 12 g colloidal silica (Nalco 1034A, diameter: 20 nm)
c) 5.44 g polyvinyl alcohol (Airvol 540 from Air Products)
d) 4.16 g polyquaternary amine (Cypro 516 from Cytec)
e) 190 g distilled water The above ingredients are mixed and then coated on a polyvinyl chloride substrate (TC-106 from Flexcon) with a #110 Myer rod and dried at 110° C. for 6 minutes to achieve a dried thickness of 42 μm. The media is then printed on Epson Stylus II (dye-based ink) at 720 dpi mode, Cannon 610 (dye-based ink) at 720 dpi mode and HP 660 (cyan, magenta, and yellow are dye-based ink, black is pigmented ink) printers. The imaging characteristics and the water resistance of this coating are shown in the Table below.

EXAMPLE 2 a) 44.44 g silica gel (20 g solid, Syloid W300 from W. R, Grace, pore volume: 1.2 cc/g, pore diameter: 15 nm, particle size: 5.5 μm)
b) 24 g colloidal silica (12 g solid, Nalco 1060 from Nalco Company, particle diameter: 60 nm)
c) 5.44 g polyvinyl alcohol (Airvol 540)
d) 8.32 g polyamine (4.16 g solid, Cypro 516)
e) 149 g distilled water The above suspension is prepared and coated on a white polyester substrate (ICI534) with a #100 Myer rod and dried at 110° C. for 6 minutes to achieve a dried thickness of 44 μm. The dried media is then images on the three printers listed above and the results are shown in the Table below.

EXAMPLE 3 a) 30 g partially calcined aluminum hydroxide (Martroxin GL-1 from Martinswerk: pore volume: 0.18 cc/g, pore size:1–1.3 nm, particle size 0.7–2.4μm, surface area: 125 $m^2$/g
b) 3.7 g 1N nitric acid
c) 50 g colloidal pseudoboehmite (24% solid, Dispal 23N4-20 from Vista Chemicals, average particle size; 5.6 nm along 020 plane and 10.3 nm along 120 plane)
d) 4.67 polyvinyl alcohol (Airvol 325 from Air Product)
e) 150 g distilled water A suspension prepared following the above formulation is prepared and coated on a polyester substrate (ICI534) with a #120 Myer rod and dried at 110° C. for 6 minutes to achieve a dried thickness of 28 μm. The obtained media is then printed on the three printers listed in example 1 and the results are shown in the Table below.

COMPARATIVE EXAMPLE 1

Example 1 is repeated with the following composition, which omits the colloidal silica:

a) 20 g silica gel (IJ35 available from Crosfield)
b) 8.8 g polyvinyl alcohol (Airvol 540 from Air Products)
c) 6.4 g polyquaternary amine (50% solid, Cypro 516 from Cytec)
d) 165 g distilled water

COMPARATIVE EXAMPLE 2

The procedure of Example 1 is again repeated using the following composition to illustrate the importance of a narrow internal pore size distribution.

a) 20 g precipitated silica (Lo-Vel 27 from PPG Industries, Inc., pore volume: 2.5 cc/g, broad pore size distribution, mean pore diameter: 63 nm, most common pore diameter: 34 nm, medium pore diameter: 128 nm)
b) 8.8 g Airvol 540
c) 6.4 g Cypro 516 (50% solid)
d) 165 g distilled water The above examples demonstrate that the present invention provides an ink jet coating exhibiting an advantageous combination of high image quality, fast image drying, and good image durability. Results from all of the Examples and Comparative Examples are shown in the Table below.

While the invention has been described with preferred embodiments, it is to be understood that variations and modifications may be resorted to as will be apparent to those skilled in the art. Such variations and modifications are to be considered within the purview and the scope of the claims appended hereto.

TABLE

| | | | Epson Stylus II | | | Canon 610 | | | HP 660 | | |
|---|---|---|---|---|---|---|---|---|---|---|---|
| | adhesive/ cohesive | wet rub | OD(K) | gamut ($\times 10^{-3}$) | Δ gamut (%) | OD(K) | gamut ($\times 10^{-3}$) | Δ gamut (%) | OD(K) | gamut ($\times 10^{-3}$) | Δ gamut (%) |
| Ex 1 | 5 | 5 | 1.63 | 283 | +5.6 | 1.77 | 306 | +7.7 | 1.57 | 339 | +5.9 |
| Comp-Ex 1 | 1 | 2 | 1.25 | 171 | −1.1 | 1.52 | 203 | +5.0 | 1.47 | 221 | +2.1 |
| Comp-Ex 2 | 2 | 1 | 1.19 | 154 | +6.4 | 1.39 | 193 | +8.4 | 1.41 | 194 | +6.3 |
| Ex 2 | 4 | 5 | 1.59 | 265 | +2.8 | 1.72 | 277 | +3.4 | 1.56 | 312 | +5.2 |
| Ex 3 | 5 | 5 | 1.50 | 186 | +1.5 | 1.62 | 226 | +2.6 | 1.50 | 229 | +3.4 |

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A printing medium useful in ink jet recording comprised of a substrate and a coating layer, with the coating layer comprising porous particles, a resin binder and colloidal particles of a size that is greater than the size of the pores of the porous particles, but smaller than the interstitial pores created by the porous particles.

2. The printing medium of claim 1, wherein the colloidal particles fill the interstitial pores created by the porous particles and create micropores between the colloidal particles which approximate the size of the internal pores of the porous particles.

3. The printing medium of claim 2, wherein the porous particles and colloidal particles are comprised of silica particles, the size of the colloidal particles is about 3.3 times the internal pore size of the pores of the porous particles, the size of the pores of the porous particles ranges from about 1 to 200 nanometers, and the size of the colloidal particles range from about 5 to 700 nanometers.

4. The printing medium of claim 1, wherein the size of the colloidal particles is about 3.3 times the internal pore size of the porous particles.

5. The printing medium of claim 1, wherein the internal pore size of the porous particles represented by $d_A^{pore}$ and the particle size of the colloidal particles represented by $d_B$ satisfy the following equation:

$$\frac{d_B}{d_A^{pore}} = 3.3x, \text{ where } x = 0.1\text{–}10.$$

6. The printing medium of claim 1, wherein the porous particles are comprised of silica particles.

7. The printing medium of claim 1, wherein the porous particles are comprised of alumina particles.

8. The printing medium of claim 1, wherein the colloidal particles are comprised of silica colloidal particles.

9. The printing medium of claim 1, wherein the colloidal particles are comprised of alumina colloidal particles.

10. The printing medium of claim 1, wherein the porous particles and the colloidal particles are both silica particles.

11. The printing medium of claim 1, wherein size of the porous particles ranges from 1 to 15 microns.

12. The printing medium of claim 1, wherein the size of the pores of the porous particles ranges from about 1 to 500 nanometers.

13. The printing medium of claim 1, wherein the size of the pores of the porous particles ranges in size from about 1 to 35 nanometers.

14. The printing medium of claim 1, wherein the size of the pores of the porous particles ranges in size from about 5 to 15 nanometers.

15. The printing medium of claim 1, wherein the size of the colloidal particles ranges from about 5 to 700 nanometers.

16. The printing medium of claim 1, wherein the size of the colloidal particles ranges from about 5 to 100 nanometers.

17. The printing medium of claim 1, wherein the size of the colloidal particles ranges from about 10 to 70 nanometers.

18. The printing medium of claim 1, wherein the resin binder is comprised of a water soluble polymer or a polymer latex.

19. The printing medium of claim 18, wherein the water soluble polymer or polymer latex is comprised of polyvinyl alcohol, an anionically or cationically modified polyvinyl alcohol, starch, modified starch, polyvinylpyrrolidone, hydroxyethyl cellulose, carboxymethyl cellulose, caesin, gelatin, polyethyleneimine, polyethyleneoxide, polyethyleneglycol, SBR latex, NBR latex, polyacrylate emulsion, polyvinylacetate latex or polyurethane dispersion.

20. The printing medium of claim 1, wherein the resin binder comprises from about 5 to 80 volume percent of the coating layer based on the volume of the porous particles and colloidal particles.

21. The printing medium of claim 1, wherein the coating layer thickness ranges from about 5 microns to 100 microns.

22. The printing medium of claim 1, wherein the thickness of the coating layer is about 1 to 5 microns above the critical thickness necessary in order to achieve high resolution image and fast drying properties.

23. The recording medium of claim 1, wherein the substrate is a paper substrate, polymer films such as polyesters and polyvinyl chloride, synthetic paper, and canvas.

24. A process for generating images in an ink jet printing apparatus, comprising incorporating the printing medium of claim 1 into said ink jet printing apparatus, forming an image on the printing medium by causing ink to be expelled onto the coated surface.

25. The process of claim 24, wherein the ink is of different colors so that the image formed on the printing medium is a color image.

26. The process of claim 24, wherein the ink is a water based ink.

* * * * *